US011113796B2

(12) United States Patent
Yang et al.

(10) Patent No.: US 11,113,796 B2
(45) Date of Patent: Sep. 7, 2021

(54) IMAGE ENHANCEMENT CIRCUIT AND METHOD THEREOF

(71) Applicant: DELTA ELECTRONICS, INC., Taoyuan (TW)

(72) Inventors: Chung-Yi Yang, Taoyuan (TW); Ching-Han Chen, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 273 days.

(21) Appl. No.: 16/248,803

(22) Filed: Jan. 16, 2019

(65) Prior Publication Data

US 2019/0251669 A1 Aug. 15, 2019

Related U.S. Application Data

(60) Provisional application No. 62/628,563, filed on Feb. 9, 2018.

(30) Foreign Application Priority Data

Jul. 4, 2018 (CN) .......................... 201810724226.4

(51) Int. Cl.
*G06T 5/00* (2006.01)
*G06T 5/10* (2006.01)
(Continued)

(52) U.S. Cl.
CPC ................ *G06T 5/003* (2013.01); *G06T 5/10* (2013.01); *G06T 5/20* (2013.01); *G06T 5/004* (2013.01);
(Continued)

(58) Field of Classification Search
None
See application file for complete search history.

(56) References Cited

U.S. PATENT DOCUMENTS 5,414,780 A * 5/1995 Carnahan ................ G06F 17/14
358/403
8,238,683 B2 * 8/2012 Ishiga ........................ G06T 7/13
382/260
(Continued)

FOREIGN PATENT DOCUMENTS

CN  102696217 A  9/2012
JP  2015-008414 A  1/2015
(Continued)

OTHER PUBLICATIONS

Daniel L. Ward,"Redundant Discrete Wavelet Transform Based Super-Resolution Using Sub-Pixel Image Registration", MSc Thesis, Mar. 2003 (Mar. 1, 2003), pp. 1-72, XP055637934, Retrieved from the Internet: URL: https://apps.dtic.mil/dtic/tr/fulltext/u2/a415684.pdfOct. 31, 2019].
(Continued)

*Primary Examiner* — Samah A Beg
(74) *Attorney, Agent, or Firm* — CKC & Partners Co., LLC

(57) ABSTRACT

An image enhancement method includes the following steps. Separating an original image signal into a high frequency image signal and a low frequency image signal by performing a wavelet transform through a first transformation circuit. Separating the high frequency image signal into a high frequency separation signal and a high-intermediate frequency separation signal by performing the wavelet transform through a second transformation circuit. Separating the low frequency image signal into a low-intermediate frequency separation signal and a low frequency separation signal by performing the wavelet transform. Enhancing high frequency separation signal to generate an enhanced high frequency separation signal configured to enhance the sharpness of an image. Through a inverse transformation circuit, integrating the enhanced high frequency separation signal,
(Continued)

the high frequency separation signal, the low-intermediate frequency separation signal, and the low frequency separation signal into an enhanced image signal by performing the inverse wavelet transform.

12 Claims, 4 Drawing Sheets

(51) Int. Cl.
    *G06T 5/20*     (2006.01)
    *H04N 9/31*     (2006.01)

(52) U.S. Cl.
    CPC ........... *G06T 2207/20028* (2013.01); *G06T 2207/20032* (2013.01); *G06T 2207/20064* (2013.01); *H04N 9/3179* (2013.01)

(56) References Cited

U.S. PATENT DOCUMENTS

| | | | | |
|---|---|---|---|---|
| 8,655,101 | B2* | 2/2014 | Gohshi | H04N 1/4092 382/275 |
| 2004/0258325 | A1* | 12/2004 | Sasada | G06T 5/004 382/275 |
| 2009/0046943 | A1* | 2/2009 | Ishiga | G06T 7/13 382/266 |
| 2010/0253447 | A1* | 10/2010 | Mallat | H03H 17/0266 333/132 |
| 2012/0147051 | A1 | 6/2012 | Zhang et al. | |
| 2013/0335634 | A1 | 12/2013 | Tai et al. | |
| 2016/0140696 | A1 | 5/2016 | Yamada | |
| 2017/0308995 | A1* | 10/2017 | Senzaki | H04N 1/409 |
| 2020/0058102 | A1* | 2/2020 | Lu | G06T 5/40 |

FOREIGN PATENT DOCUMENTS

| | | |
|---|---|---|
| TW | 201225000 A1 | 6/2012 |
| TW | 201324375 A1 | 6/2013 |
| TW | 201401857 A | 1/2014 |

OTHER PUBLICATIONS

Bute Yamini et al., "Architecture of Discrete Wavelet Transform Processor for Image Compression", International Journal of Computer Science and Mobile Computing, vol. 2 Issue.6, Jun. 2013 (Jun. 1, 2013), pp. 41-45 XP055638012.

Yang Y. et al., "Medical image enhancement algorithm based on wavelet transform", Electronic Letters, the Institution Ofengineering and Technology, vol. 46. No. 2, January (Jan. 21, 2010), pp. 120-121 XP006034628, ISSN: 1350-911X, DOI : 10.1049/EL:20102063.

Yuanyuan Hou et al., "Approach on digital radiographs enhancement based on wavelet transform" Image and S Signal Processing (CISP), 2010 3rd International Congress on, IEEE, Piscataway NJ. USA, Oct. 16, 2010 (Oct. 16, 2010), pp. 654-658. XP031809626. ISBN : 978-1-4244-6513-2.

\* cited by examiner

IMAGE ENHANCEMENT CIRCUIT AND METHOD THEREOF

CROSS-REFERENCE TO RELATED APPLICATION

This application claims priority to U.S. Provisional Application Ser. No. 62/628,563, filed Feb. 9, 2018 and China Application Serial Number 201810724226.4, filed Jul. 4, 2018, which are herein incorporated by reference.

BACKGROUND

Technical Field

The present disclosure relates to an image enhancement circuit, which can improve a problem that when an image is projected as a large-sized image on the screen, the projected image is not sharp enough.

Description of Related Art

In recent years, with the prevalence of consumer multimedia products, the display quality of images has become a major consideration for consumers in purchasing products, and image processing technology has become one of the key research topics in the industry. "Image Enhancement" is a very common function in image processing to make images appear more clearly. For all kinds of multimedia display products such as flat panel displays and projectors, "image enhancement" is the most important core function. Therefore, the image enhancement circuit and its processing method will directly affect the production cost and display performance of the multimedia display product.

SUMMARY

One aspect of the present disclosure is an image enhancement method. The image enhancement method includes the following steps. Separating an original image signal into a high frequency image signal and a low frequency image signal through performing a wavelet transform by a first transformation circuit. Separating the high frequency image signal into a high frequency separation signal and a high-intermediate frequency separation signal through performing the wavelet transform by a second transformation circuit. Separating the low frequency image signal into a low-intermediate frequency separation signal and a low frequency separation signal through performing the wavelet transform by a third transformation circuit. Enhancing the high frequency separation signal by a high frequency enhancement circuit to generate an enhanced high frequency separation signal. Integrating the enhanced high frequency separation signal, the high-intermediate frequency separation signal, the low-intermediate frequency separation signal and the low frequency separation signal into an enhanced image signal through performing an inverse wavelet transform by an inverse transformation circuit.

Another aspect of the present disclosure is an image enhancement circuit. The image enhancement circuit includes a first transformation circuit, a second transformation circuit, a third transformation circuit, a high frequency enhancement circuit and an inverse transformation circuit. The first transformation circuit is configured to receive an original image signal, and separate the original image signal into a high frequency image signal and a low frequency image signal through performing a wavelet transform. The second transformation circuit is electrically coupled to the first transformation circuit and configured to receive the high frequency image signal. The second transformation circuit is configured to separate the high frequency image signal into a high frequency separation signal and a high-intermediate frequency separation signal through performing the wavelet transform. The third transformation circuit is electrically coupled to the first transformation circuit and is configured to receive the first transformation circuit and configured to receive the low frequency image signal. The third transformation circuit is configured to separate the low frequency image signal into a low-intermediate frequency separation signal and a low frequency separation signal through performing the wavelet transform. The high frequency enhancement circuit is electrically coupled to the second transformation circuit and configured to receive the high frequency separation signal, and enhance the high frequency separation signal to generate an enhanced high frequency separation signal. The inverse transformation circuit is electrically coupled to the second transformation circuit, the third transformation circuit and the high frequency enhancement circuit and configured to receive the enhanced high frequency separation signal, the high-intermediate frequency separation signal, the low-intermediate frequency separation signal and the low frequency separation signal so as to output an enhanced image signal.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

For the embodiment below is described in detail with the accompanying drawings, embodiments are not provided to limit the scope of the present disclosure. Moreover, the operation of the described structure is not for limiting the order of implementation. Any device with equivalent functions that is produced from a structure formed by a recombination of elements is all covered by the scope of the present disclosure. Drawings are for the purpose of illustration only, and not plotted in accordance with the original size.

It will be understood that when an element is referred to as being "connected to" or "coupled to", it can be directly connected or coupled to the other element or intervening elements may be present. In contrast, when an element to another element is referred to as being "directly connected" or "directly coupled," there are no intervening elements present. As used herein, the term "and/or" includes an associated listed items or any and all combinations of more.

Figure 1:
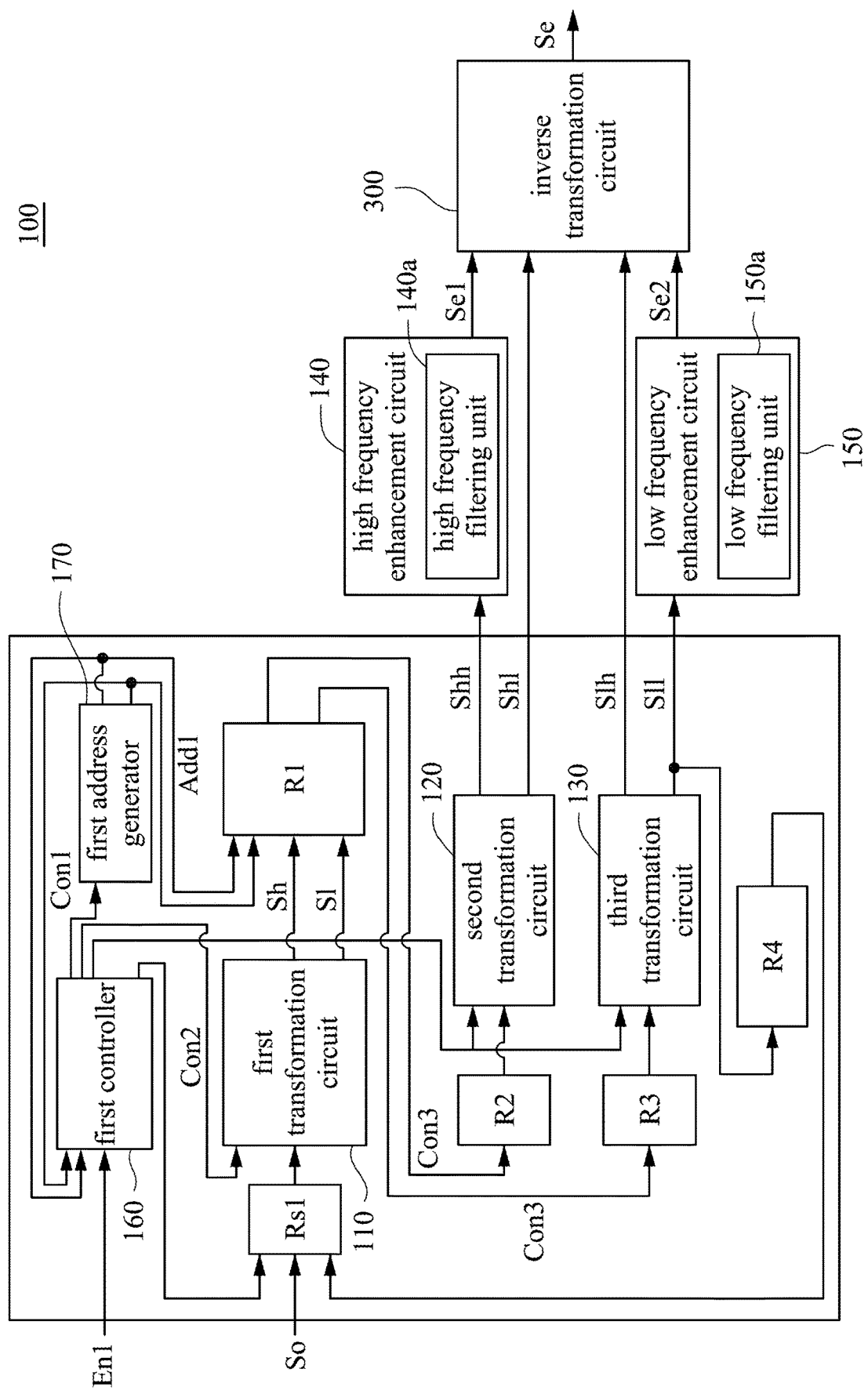
FIG. 1 is a schematic diagram of an image enhancement circuit in some embodiments of the present disclosure.

Please refer to FIG. 1, which is a schematic diagram of an image enhancement circuit 100 in some embodiments of the present disclosure. The image enhancement circuit 100 includes a first transformation circuit 110, a second transformation circuit 120, a third transformation circuit 130, a high frequency enhancement circuit 140 and an inverse transformation circuit 300.

Figure 2:
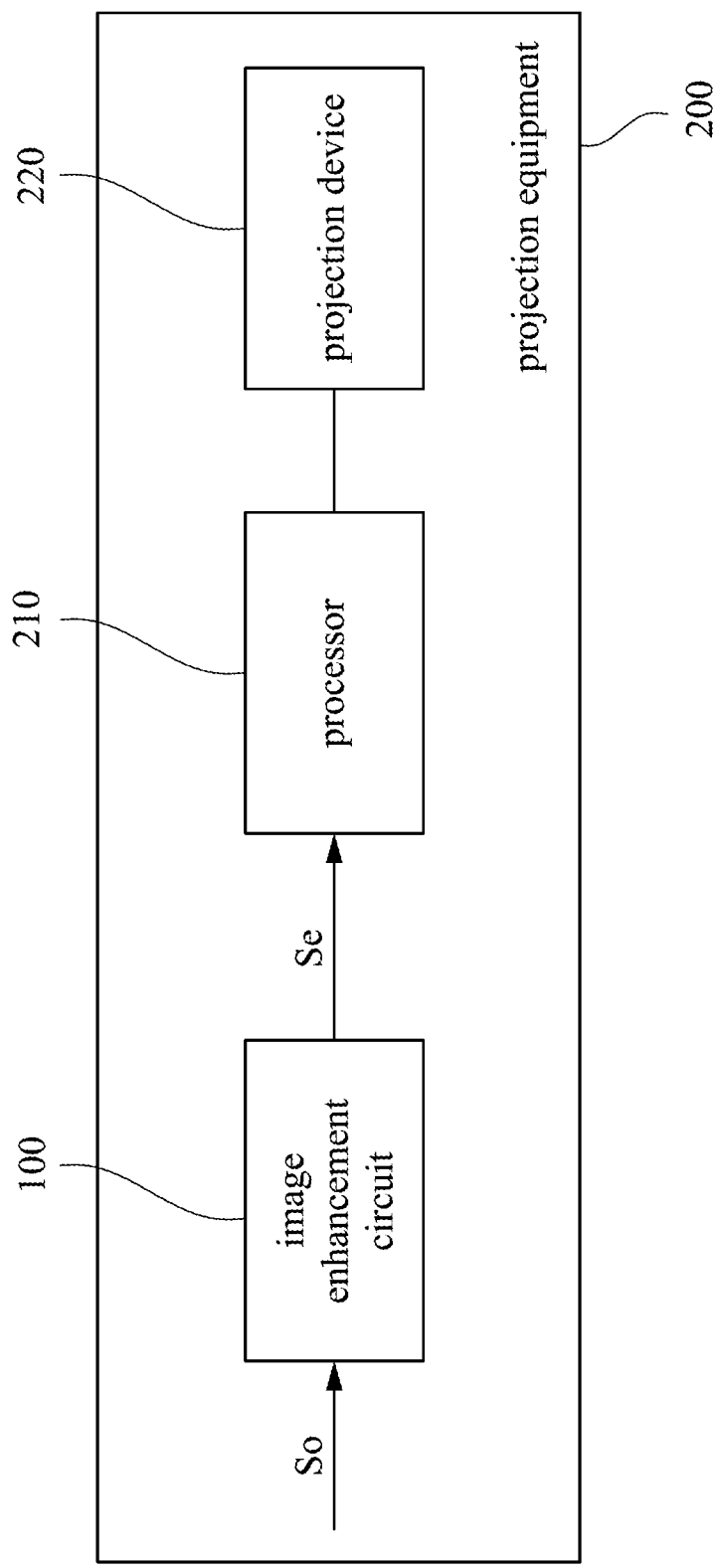
FIG. 2 is a schematic diagram of a projection device in some embodiments of the present disclosure.

Referring to FIG. 2, in some embodiments, the image enhancement circuit 100 is disposed in a projection equipment 200 for receiving an original image signal So and outputting an enhanced image signal Se to a processor 210 in the projection equipment 200 to enable the processor 210 to drive the projection device 220 to project a screen image. In some embodiments, the projection device 220 can include a Digital Micromirror Device (DMD). In some other embodiments, the projection equipment 200 can be a liquid crystal projector. Since the technical principle of DMD projection or liquid crystal projection can be understood by those skilled in the art, the structure of the projection device will not be further described herein. The present disclosure focuses on a method of enhancing the original image signal So to improve the projection quality of the projection device.

In other embodiments, the image enhancement circuit 100 can be disposed outside the projection equipment 200. For example, the image enhancement circuit 100 can be disposed in an electronic device and transmit the enhanced image signal Se to the projection equipment 200 through the wired or wireless transmission. In some embodiments, the image enhancement circuit 100 can also be applied to a flat panel display or various multimedia products.

In some embodiments, the original image signal So and the enhanced image signal Se may be lower resolution video signals, for example, 4K video signals. The processor 210 of the projection equipment 200 can use a dual-modulation technique or a pixel-shifting technique to output a higher resolution screen image, for example, an 8K image. Since the technical principle of dual-modulation and pixel-shifting can be understood by those skilled in the art, no further details will be given herein.

The first transformation circuit 110 is configured to receive the original image signal So and perform the wavelet transform to separate the original image signal So into a high frequency image signal Sh and a low frequency image signal Sl. The wavelet transform is an analysis technique combining wavelet analysis and wavelet synthesis. When performing the wavelet transform, the original image signal So can be considered to include consistent data and varied data. For example, in a landscape image, the blue area of the sky can be considered as the consistent data of the original image signal So. For the outline of the object in the image, it can be considered as the varied data because the color difference of it is large or it is doped by multiple colors. The wavelet transform retains the consistent data of the original image signal So through low frequency filtering, and retains the varied data of the original image signal So through high frequency filtering. Those skilled in the art can understand the circuit structure for implementing the wavelet transform, thus no further details will be given herein.

The second transformation circuit 120 is electrically connected to the first transformation circuit 110 for receiving the high frequency image signal Sh. The second transformation circuit 120 can also perform the wavelet transform to separate the high frequency image signal Sh into a high frequency separation signal Shh and a high-intermediate frequency separation signal Shl. The third transformation circuit 130 is electrically connected to the first transformation circuit 110 for receiving the low frequency image signal Sl. The third transformation circuit 130 can also use the wavelet transform to separate the low frequency image signal Sl into a low-intermediate frequency separation signal Slh and a low frequency separation signal Sll.

In some embodiments, the first transformation circuit 110 performs a first-order and one-dimensional wavelet transform on the original image signal So. That is, the original image signal So is separated into a high frequency portion (i.e., the high frequency image signal Sh) and a low frequency portion (i.e., the low frequency image signal Sl). The second transformation circuit 120 and the third transformation circuit 130 perform a second-order and two-dimensional wavelet transform for the high frequency image signal Sh and the low frequency image signal Sl, respectively. For example, each row of pixels of the original image signal So is regarded as a set of image sequences, and the first transformation circuit 110 will perform the first-order wavelet transform on it to generate the high frequency image signal Sh and the low frequency image signal Sl. Each column of pixels of the high frequency image signal Sh is regarded as a set of image sequences, and the second transformation circuit 120 will performs the second-order wavelet transform on it to generate the two dimensional high frequency separation signal Shh and the high-intermediate frequency separation signal Shl. Similarly, each column of pixels of the low frequency image signal Sl is regarded as a set of image sequences, and the third transformation circuit 130 will perform the second-order wavelet transform on it to generate the two dimensional low-intermediate frequency separation signal Slh and the low frequency separation signal Sll.

The high frequency enhancement circuit 140 is electrically connected to the second transformation circuit 120 for receiving the high frequency separation signal Shh. The high frequency enhancement circuit 140 enhances the high frequency separation signal Shh to generate an enhanced high frequency separation signal Se1. In the image composition, the high frequency signal represents a portion where the gray scale value changes greatly within a predetermined narrow image area. Therefore, the enhanced high frequency separation signal Se1 generated by the high frequency enhancement circuit 140 has an effect of improving sharpness. The inverse transformation circuit 300 is electrically connected to the second transformation circuit 120, the third transformation circuit 130 and the high frequency enhancement circuit 140, and receives the enhanced high frequency separation signal Se1, the high-intermediate frequency separation signal Shl, the low-intermediate frequency separation signal Slh and the low frequency separation signal Sllso as to output the enhanced image signal Se accordingly.

The present disclosure separates two-dimensional and different frequency signals (i.e., the high frequency separation signal Shh, the high-intermediate frequency separation signal Shl, the low-intermediate frequency separation signal Slh, and the low frequency separation signal Sll) through performing two orders wavelet transform, and enhances the high frequency separation signal Shh with the highest frequency. Accordingly, the clarity and sharpness of the screen image can be enhanced, so that the outline of the object in the large-sized screen image that the projection equipment 200 projects will not be blurred. In addition, the wavelet transform not only has the advantage of separating the high-frequency and low-frequency portions from the original image signal So, but also the circuit structure of it is more compact. Therefore, the lower production cost and the reduced overall volume of the image enhancement circuit 100 are ensured.

In some embodiments, the high frequency enhancement circuit 140 generates the enhanced high frequency separation signal Se1 by multipling the high frequency separation signal Shh by an enhancement factor (e.g., one or two times, in which the enhancement factor may be a positive integer or any coefficient) to increase the sharpness of the enhanced image signal. However, the method for enhancing the image is not limited thereto. In some other embodiments, the high frequency enhancement circuit 140 generates the enhanced high frequency separation signal Se1 by filtering the high frequency separation signal Shh. For example, the high frequency enhancement circuit 140 includes a high frequency filtering unit 140a. The high frequency filtering unit 140a is configured to filter the high frequency separation signal Shh by Gaussian filtering, bilateral filtering, median filtering or adjacent pixel averaging to generate the enhanced high frequency separation signal Se1.

In some embodiments, the image enhancement circuit 100 further includes a low frequency enhancement circuit 150. The low frequency enhancement circuit 150 is electrically connected to the third transformation circuit 130 and an inverse transformation circuit 300 for receiving the low frequency separation signal Sll and enhancing the low frequency separation signal Sll to generate an enhanced low frequency separation signal Se2, resepectively. The inverse transformation circuit 300 receives the enhanced low frequency separation signal Se2 and integrate the enhanced high frequency separation signal Se1, the high-intermediate frequency separation signal Shl, the low-intermediate frequency separation signal Slh and the enhanced low frequency separation signal Se2 into the enhanced image signal through performing an inverse wavelet transform.

In some embodiments, the low frequency enhancement circuit 150 includes a low frequency filtering unit 150a for enhancing the low frequency separation signal Sll through an unsharp masks, a Laplacian masks or a high frequency filters to generate the enhanced low frequency separation signal Se2. By enhancing the low frequency separation signal Sll, the clarity and sharpness of the enhanced image signal can be further improved.

In some embodiments, the image enhancement circuit 100 further includes a first temporary storage switch Rs1, a first controller 160, a first address generator 170 and multiple registers R1-R4. The first temporary storage switch Rs1 is configured to transmit the original image signal So to the first transformation circuit 110. The first controller 160 is configured to control the first transformation circuit 110, the second transformation circuit 120, and the third transformation circuit 130 to perform the wavelet transform. The first address generator 170 is configured to receive the control signal transmitted from the first controller 160 to generate an address signal accordingly. The second transformation circuit 120 and the third transformation circuit 130 perform the wavelet transform according to the address signal.

In some embodiments, the first controller 160 is configured to receive the first enable signal En1 and then outputs a first control signal Con1 to the first address generator 170, outputs a second control signal Con2 to the first transformation circuit 110, outputs a third control signal Con3 to the second transformation circuit 120 and the third transformation circuit 130 according to the first enable signal En1. The first transformation circuit 110 performs the first-order wavelet transform according to the second control signal Con2, and stores the output high frequency separation signal Shh and the high-intermediate frequency separation signal Shl in the register R1. The first address generator 170 outputs the first address signal Add1 according to the first control signal Con1. The first address signal Add1 is transmitted to the second transformation circuit 120 and the third transformation circuit 130 through the registers R1, R2, and R3 in oder.

In some embodiments, the first address signal Add1 includes a read/write signal for recording the positions of pixels, which are currently computed by the first transformation circuit 110. Accordingly, the register R1 can integrate the low frequency signal into the low frequency image signal Sl and integrate the high frequency signal into the high frequency image signal Sh after the first transformation circuit 110 performs wavelet analysis on each row of pixels of the original image signal So. The second transformation circuit 120 and the third transformation circuit 130 perform the second-order wavelet transform according to the third control signal Con3 and the first address signal Add1. The third transformation circuit 130 also transmits a feedback signal to the first temporary storage switch Rs1 through the register R4, so that the first temporary storage switch Rs1 confirms that one frame of the original image signal So has completed the wavelet transform.

The inverse transformation circuit 300 is configured to perform inverse wavelet transform to integrate the enhanced high frequency separation signal Se1, the high-intermediate frequency separation signal Shl, the low-intermediate frequency separation signal Slh and the enhanced low frequency separation signal Se2 (or the low frequency separation signal Sll). Therefore, the circuit structure of the inverse transformation circuit 300 will correspond to the first transformation circuit 110, the second transformation circuit 120 and the third transformation circuit 130.

Figure 3:
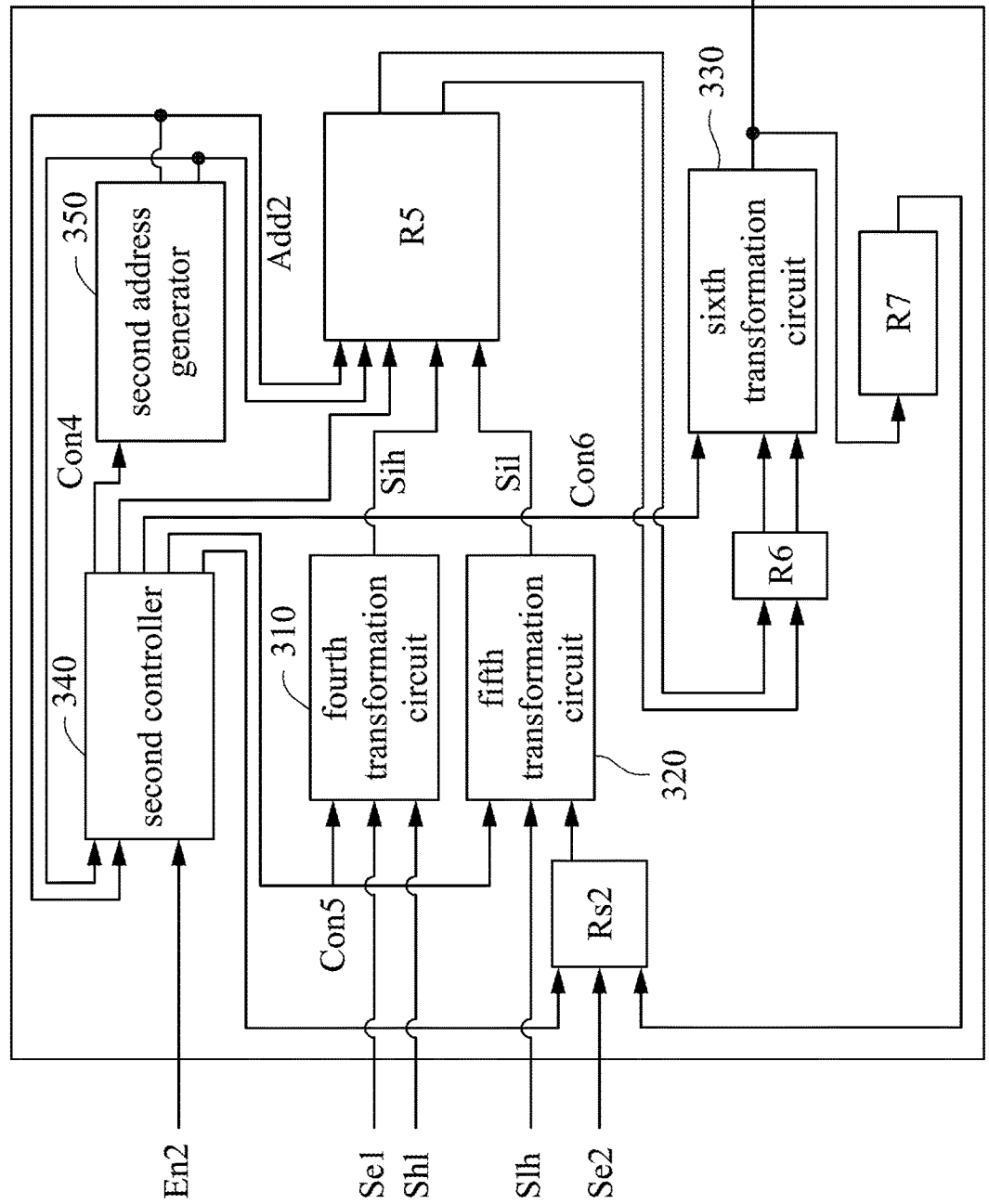
FIG. 3 is a schematic diagram of an inverse transformation circuit in some embodiments of the present disclosure.

Please refer to FIG. 3, which is a schematic diagram of the inverse transformation circuit 300 according to some embodiments of the present disclosure. In some embodiments, the inverse transformation circuit 300 includes a fourth transformation circuit 310, a fifth transformation circuit 320, and a sixth transformation circuit 330. The fourth transformation circuit 310 is electrically connected to the second transformation circuit 120 and the high frequency enhancement circuit 140 for receiving the enhanced high frequency separation signal Se1 and the high-intermediate frequency separation signal Shl. The fourth transformation circuit 310 integrates the enhanced high frequency separation signal Se1 and the high-intermediate frequency separation signal Shl by performing the inverse wavelet transform to output an inverse high frequency signal Sih. The fifth transformation circuit 320 is electrically connected to the third transformation circuit 130 for receiving the low-intermediate frequency separation signal Slh and the low frequency separation signal Sll. The fifth transformation circuit 320 integrates the low-intermediate frequency separation signal Slh and the low frequency separation signal Sll by performing the inverse wavelet transform to output an inverse low frequency signal Sil.

The sixth transformation circuit 330 is electrically connected to the fourth transformation circuit 310 and the fifth transformation circuit 320 for receiving the inverse high frequency signal Sih and the inverse low frequency signal Sil. The sixth transformation circuit 330 integrates the inverse high frequency signal Sih and the inverse low frequency signal Sil to output an enhanced image signal Se.

In other embodiments, the inverse transformation circuit 300 further includes a second controller 340, a second address generator 350, a second temporary storage switch Rs2, and multiple registers R5, R6, R7. The second controller 340 is configured to control the fourth transformation circuit 310, the fifth transformation circuit 320, and the sixth transformation circuit 330 to perform the inverse wavelet transform. The second temporary storage switch Rs2 is configured to turn on the fifth transformation circuit 320. The second controller 340 is configured to receive the second enable signal En2, and output the fourth control signal Con4 to the second address generator 350, output the fifth control signal Con5 to the fourth transformation circuit 310 and the fifth transformation circuit 320, and output the sixth control signal Con6 to the sixth transformation circuit 330 according to the second enable signal En2.

The fourth transformation circuit 310 and the fifth transformation circuit 320 perform the first-order inverse wavelet transform according to the fifth control signal Con5, and store the output inverse high frequency signal Sih and the inverse low frequency signal Sil in the register R5. The second address generator 350 outputs the second address signal Add2 according to the fourth control signal Con4. The second address signal Add2 is transmitted to the sixth transformation circuit 330 through the registers R5 and R6 in order, so that the sixth transformation circuit 330 performs the second-order inverse wavelet transform according to the second address signal Add2 and the sixth control signal Con6. The sixth transformation circuit 330 can also transmit a feedback signal to the second temporary storage switch Rs2 through the register R7, so that the second temporary storage switch Rs2 confirms that one frame of the original image signal So has completed the inverse wavelet transform.

Figure 4:
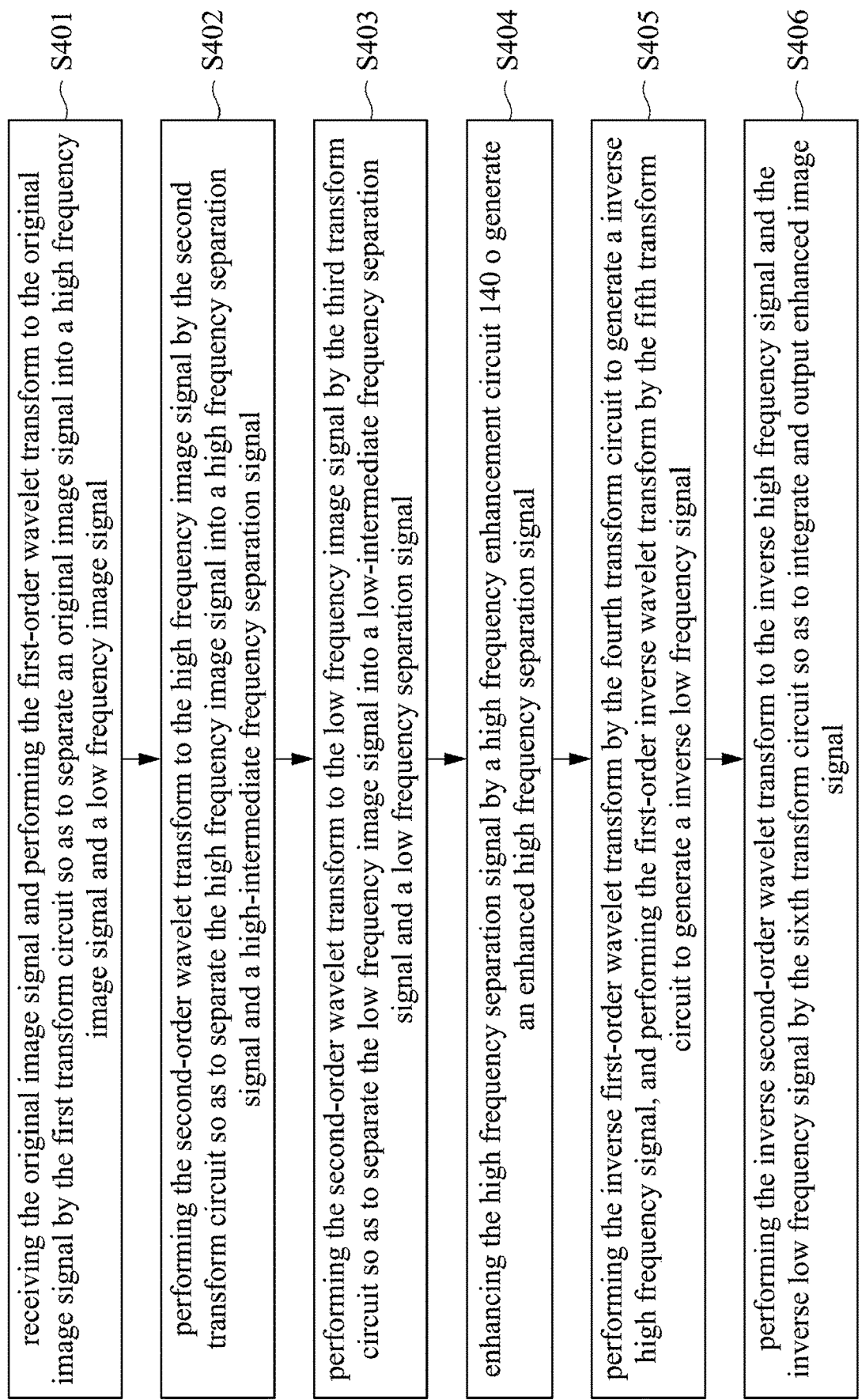
FIG. 4 is a flowchart illustrating an image enhancement method in some embodiments of the present disclosure.

Please refer to FIG. 4, which is a flowchart of an image enhancement method according to some embodiments of the present disclosure. For convenience and clarity of explanation, the image enhancement method described below is described with reference to the embodiments shown in FIG. 1 to FIG. 3, but it is not limited thereto. Anyone who is familiar with this skill can make various changes without departing from the spirit and scope of the case. As shown in FIG. 4, the control method includes steps S410 to S406.

First, in step S401, receiving the original image signal So from the electronic device and performing the first-order wavelet transform to the original image signal So by the first transformation circuit 110 so as to separate an original image signal So into a high frequency image signal Sh and a low frequency image signal Sl.

In step S402, performing the second-order wavelet transform to the high frequency image signal Sh by the second transformation circuit 120 so as to separate the high frequency image signal Sh into a high frequency separation signal Shh and a high-intermediate frequency separation signal Shl.

In step S403, performing the second-order wavelet transform to the low frequency image signal Sl by the third transformation circuit 130 so as to separate the low frequency image signal Sl into a low-intermediate frequency separation signal Slh and a low frequency separation signal Sll.

In step S404, enhancing the high frequency separation signal Shh by a high frequency enhancement circuit 140 to generate an enhanced high frequency separation signal Se1. The enhanced high frequency separation signal Se1 is configured to enhance the sharpness of the image. In addition, in other embodiments, the low frequency enhancement circuit 150 is configured to enhance the low frequency separation signal Sll to generate an enhanced low frequency separation signal Se2.

In step S405, performing the inverse first-order wavelet transform to the enhanced high frequency separation signal Se1 and the high-intermediate frequency separation signal Shl by the fourth transformation circuit 310 of the inverse transformation circuit 300 to generate a inverse high frequency signal Sih. At the same time, performing the first-order inverse wavelet transform to the low-intermediate frequency separation signal Slh and the low frequency separation signal Sl (or the enhanced low frequency separation signal Se2) by the fifth transformation circuit 320 of the inverse transformation circuit 300 to generate a inverse low frequency signal Sil.

In step S406, performing the inverse second-order wavelet transform to the inverse high frequency signal Sih and the inverse low frequency signal Sil by the sixth transformation circuit 330 of the inverse transformation circuit 300 so as to integrate and output enhanced image signal Se.

The image enhancement method of the present disclosure is to separate the original image signal So into multiple image signals with different frequencies through a twostages wavelet transform, and then enhance the high frequency separation signal Shh with the highest frequency. Accordingly, the enhanced image signal Se outputted by integrating all the image signals will be clearer than the original image signal So, and is more suitable for projecting as a large-sized image.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims.

What is claimed is:

1. An image enhancement method, comprising:
   separating an original image signal into a high frequency image signal and a low frequency image signal through performing a wavelet transform by a first transformation circuit;
   separating the high frequency image signal into a high frequency separation signal and a high-intermediate frequency separation signal through performing the wavelet transform by a second transformation circuit;
   separating the low frequency image signal into a low-intermediate frequency separation signal and a low frequency separation signal through performing the wavelet transform by a third transformation circuit;
   enhancing the high frequency separation signal by a high frequency enhancement circuit to generate an enhanced high frequency separation signal;
   enhancing the low frequency separation signal by a low frequency enhancement circuit to generate an enhanced low frequency separation signal; and
   integrating the enhanced high frequency separation signal, the high-intermediate frequency separation signal, the low-intermediate frequency separation signal and the enhanced low frequency separation signal into an enhanced image signal through performing an inverse wavelet transform by an inverse transformation circuit.

2. The image enhancement method of claim 1, wherein enhancing the high frequency separation signal further comprises:
   multiplying the high frequency separation signal by an enhancement factor to generate the enhanced high frequency separation signal.

3. The image enhancement method of claim 1, wherein enhancing the high frequency separation signal further comprises:
   filtering the high frequency separation signal to generate the enhanced high frequency separation signal.

4. The image enhancement method of claim 3, wherein filtering the high frequency separation signal further comprises:
   filtering the high frequency separation signal through Gaussian filtering, bilateral filtering, median filtering, or adjacent pixel averaging.

5. The image enhancement method of claim 1, wherein enhancing the low frequency separation signal further comprises:
   enhancing the low frequency separation signal through an unsharp mask, a Laplacian mask or a high frequency filter.

6. The image enhancement method of claim 1, further comprising:
   generating an inverse high frequency signal through performing the inverse wavelet transform on the enhanced high frequency separation signal and the high-intermediate frequency separation signal by a fourth transformation circuit;
   generating an inverse low frequency signal through performing the inverse wavelet transform on the low-intermediate frequency separation signal and the enhanced low frequency separation signal by a fifth transformation circuit; and
   integrating the inverse high frequency signal and the inverse low frequency signal into the enhanced image signal through performing the inverse wavelet transform on the inverse high frequency signal and the inverse low frequency signal by a sixth transformation circuit.

7. An image enhancement circuit, comprising:
   a first transformation circuit configured to receive an original image signal, and separate the original image signal into a high frequency image signal and a low frequency image signal through performing a wavelet transform;
   a second transformation circuit electrically coupled to the first transformation circuit and configured to receive the high frequency image signal, and separate the high frequency image signal into a high frequency separation signal and a high-intermediate frequency separation signal through performing the wavelet transform;
   a third transformation circuit electrically coupled to the first transformation circuit and configured to receive the low frequency image signal, and separate the low frequency image signal into a low-intermediate frequency separation signal and a low frequency separation signal through performing the wavelet transform;
   a high frequency enhancement circuit electrically coupled to the second transformation circuit and configured to receive the high frequency separation signal, and enhance the high frequency separation signal to generate an enhanced high frequency separation signal;
   a low frequency enhancement circuit electrically coupled to the third transformation circuit and configured to receive the low frequency separation signal, and enhance the low frequency separation signal to generate an enhanced low frequency separation signal; and
   an inverse transformation circuit electrically coupled to the second transformation circuit, the third transformation circuit, the high frequency enhancement circuit and the low frequency enhancement circuit, and configured to receive the enhanced high frequency separation signal, the high-intermediate frequency separation signal, the low-intermediate frequency separation signal and the enhanced low frequency separation signal so as to output an enhanced image signal.

8. The image enhancement circuit of claim 7, wherein the high frequency enhancement circuit comprises a high frequency filtering unit configured to filter the high frequency separation signal through Gaussian filtering, bilateral filtering, median filtering, or adjacent pixel averaging to generate the enhanced high frequency separation signal.

9. The image enhancement circuit of claim 7, wherein the low frequency enhancement circuit comprises a low frequency filtering unit configured to enhance the low frequency separation signal through an unsharp mask, a Laplacian mask or a high frequency filter to generate the enhanced low frequency separation signal.

10. The image enhancement circuit of claim 7, wherein the inverse transformation circuit comprises:
    a fourth transformation circuit electrically coupled to the second transformation circuit and the high frequency enhancement circuit and configured to receive the enhanced high frequency separation signal and the high-intermediate frequency separation signal to generate an inverse high frequency signal through performing an inverse wavelet transform;
    a fifth transformation circuit electrically coupled to the third transformation circuit and configured to receive the low-intermediate frequency separation signal and the enhanced low frequency separation signal and generate an inverse low frequency signal through performing the inverse wavelet transform; and
    a sixth transformation circuit electrically coupled to the fourth transformation circuit and the fifth transformation circuit and configured to receive the inverse high frequency signal and the inverse low frequency signal, and integrate the inverse high frequency signal and the inverse low frequency signal into the enhanced image signal.

11. The image enhancement circuit of claim 10, wherein the inverse transformation circuit further comprises:
    a second controller configured to control the fourth transformation circuit, the fifth transformation circuit and the sixth transformation circuit to perform the inverse wavelet transform; and
    a second address generator configured to receive a fourth control signal transmitted from the second controller to generate a second address signal;
    wherein the fourth transformation circuit and the fifth transformation circuit perform the inverse wavelet transform according to a fifth control signal transmitted from the second controller, and the sixth transformation circuit performs the inverse wavelet transform according to the second address signal transmitted from the second address generator and a sixth control signal transmitted from the second controller.

12. The image enhancement circuit of claim 7, further comprising:
    a first controller configured to control the first transformation circuit, the second transformation circuit and the third transformation circuit to perform the wavelet transform; and
    a first address generator configured to receive a first control signal transmitted from the first controller to generate a first address signal, wherein the second transformation circuit and the third transformation circuit perform the wavelet transform according to the first address signal.

* * * * *